United States Patent [19]

Cape

[11] 3,925,070

[45] Dec. 9, 1975

[54] BRAZING ALLOY

[75] Inventor: Arthur T. Cape, Monterey, Calif.

[73] Assignee: Coast Metals, Inc., Little Ferry, N.J.

[22] Filed: Apr. 24, 1974

[21] Appl. No.: 463,451

[52] U.S. Cl. ............. 75/159; 75/134 C; 75/134 M; 75/153; 75/161
[51] Int. Cl.² .......................................... C22C 9/05
[58] Field of Search ......... 75/153, 159, 161, 134 C, 75/134 M; 29/501, 504

[56] References Cited

UNITED STATES PATENTS

| 385,909 | 7/1888 | Church | 75/159 |
|---|---|---|---|
| 2,270,868 | 1/1942 | Dean et al. | 75/159 |
| 3,197,859 | 7/1965 | Cape | 29/501 |
| 3,198,609 | 8/1965 | Cape | 75/159 |
| 3,519,416 | 7/1970 | Mizuhara | 75/159 X |
| 3,693,246 | 9/1972 | Novikov et al. | 75/159 X |

FOREIGN PATENTS OR APPLICATIONS

| 638,485 | 3/1962 | Canada | 75/159 |
|---|---|---|---|

Primary Examiner—C. Lovell
Attorney, Agent, or Firm—Isler and Ornstein

[57] ABSTRACT

Brazing alloys of the type described in U.S. Pat. Nos. 3,197,859 and 3,198,609 are disclosed, containing gold in appreciable amounts, providing substantial increases in the average shear strength of such alloys, and improvements in flow of the alloys.

2 Claims, No Drawings

BRAZING ALLOY

This invention relates, as indicated, to brazing alloys, but is directed more particularly to brazing alloys of the type described in my U.S. Pat. Nos. 3,197,859 and 3,198,609.

In my U.S. Pat. No. 3,197,859, a brazing alloy is disclosed consisting essentially of from about 40% to about 75% copper, from about 3% to about 18% cobalt, and the remainder essentially all manganese, but in an amount not less than about 20%. The patent further discloses that nickel, in an amount of from about 3% to about 20%, may replace at least one of the metals selected from the group consisting of copper and manganese, but the resulting relative proportions of copper, manganese and nickel in the alloy being such that the copper is never less than about 40%, the manganese is never less than about 20%, and the nickel constitutes between about 3% and about 20% of the brazing alloy.

Expressed in another manner, the brazing alloy has the following composition:

| | |
|---|---|
| Copper | 40 – 75% |
| Cobalt | 3 – 18% |
| Nickel | 0 – 20% |
| Manganese | Remainder, but not less than 20% |

One of the examples of the alloy of the aforesaid patent consists of 63% copper, 10% cobalt, 5% nickel, and 22% manganese, which has a liquidus of 1755° F., a solidus of 1730° F., and a recommended brazing temperature of 1850° F., is used for controlled atmosphere brazing with hydrogen or inert gases, and produces sound, tight joints, with excellent strength retention at elevated service temperatures in a wide range of high strength steels. Its oxidation and corrosion resistance is good, and in the form of wire, it has good welding properties and is well suited for use with the inert arc process. Its physical properties, in the annealed condition, are as follows:

| | |
|---|---|
| Ultimate strength | 109,000 psi |
| Yield strength | 57,000 psi |
| Elongation | 18% |

In my U.S. Pat. No. 3,198,609, a similar brazing alloy is disclosed, consisting essentially of from about 35% to about 75% copper, about 3% to about 20% nickel, and the remainder essentially all manganese, with the ratio of manganese to nickel being not less than 2.25:1.

One of the examples of the alloy of the aforesaid patent consists of 67.5% copper, 9% nickel, and 23.5% manganese, which may be used in the form of powder, wire or foil, for controlled atmosphere brazing with hydrogen or inert gases, and produces sound, tight joints with excellent strength retention at elevated service temperatures in a wide range of high strength steels. Its oxidation and corrosion resistance is good, and, in the form of wire, it has good welding properties and is well suited for use with the inert arc processes. Its principal use is in the brazing and welding of high alloy steels, particularly where thin sections are involved and a minimum of penetration or erosion is required. Brazing of 347 and 321 stainless steels, precipitation hardening stainless steels in the 300 series, and heat resisting steels are typical examples.

The liquidus of this alloy is about 1710° F., its solidus about 1670° F., and its recommended brazing temperature about 1800° F.

Its physical properties, in the annealed condition, are as follows:

| | |
|---|---|
| Ultimate strength | 99,000 psi |
| Yield strength | 52,000 psi |
| Elongation | 20% |

In an article, entitled "Brazing Filler Metal Evaluation for an Aircraft Turbine Engine Application," by R. P. Schaeffer, J. E. Flynn and J. R. Doyle, published in the September 1971 issue of Welding Research Supplement, which discloses the basic characteristics of some silver, copper and nickel-base filler metals, tests were conducted to determine the tensile shear strength of braze joints utilizing such filler metals.

The specimens selected for such tests were Tee-joint specimens, referred to in the article as single-lap shear specimens, in which the thickness of the strips or pieces used was ⅛ inch, and the overlap of the two pieces was 3/16 inch, so that the Tee value is the ratio of 3/16 to ⅛ inch or 3:2, that is to say, a 1½ Tee. The so-called shear strength is the brazed area (½ inch) multiplied by the length of the lap (3/16 inch) or 3/32 square inches multiplied by the load. In the case of alloy 9217, on page 399-s of the article, since the average tensile shear strength, at 1200° F., is given as 15,100 psi, the load was 15,100 multiplied by 3/32, or 1415.63 pounds.

Utilizing the aforesaid test for an alloy or filler metal consisting of 52.5% copper, 9.0% nickel, and 38.5% manganese, disclosed in the aforesaid U.S. Pat. No. 3,198,609, and known as Coast Metal 1600N, I found that the average tensile shear strength, at 1200° F., was approximately 15,000 psi.

I have found that by adding gold, in an amount of 3%, to the aforesaid copper-nickel-manganese alloy, that the resulting alloy has an average tensile shear strength, at 1200° F., of 23,000 psi, which represents an increase of more than 50% in shear strength over the aforesaid copper-nickel-manganese alloy.

The increase in shear strength over the copper-nickel-manganese alloy is far more than could be expected, considering the similarity in compositions of the respective alloys.

The shear strength of the aforesaid 1600N alloy increases with the addition of 1% gold and reaches a level at about 3%. Increasing the gold content beyond 3% and up to 20% is of little advantage insofar as the physical properties of the alloy is concerned, but there is an advantage in improving the flow of the alloy, and this, in itself, can be a factor in increasing the strength of a part where the alloy is used for brazing such part. The improvement in flow is offset, however, by the additional cost of the alloy, due to the relatively high gold content.

The invention contemplates the following range of compositions:

| | Range | Preferred |
|---|---|---|
| Copper | 30–70% | 52.5% |
| Cobalt | 0–18% | |
| Nickel | 3–20% | 9.00 |
| Manganese | Remainder, but not less than 20% | 35.5 |
| Gold | 1–20% | 3% |

| | -continued | |
|---|---|---|
| | Range | Preferred |
| | 100% | 100% |

It is to be understood that slight changes may be made in the aforesaid compositions, without departing from the spirit of the invention or the scope of the appended claims.

Having thus described my invention, I claim:

1. A brazing alloy of relatively high tensile shear strength at elevated temperatures, said alloy consisting of from about 30% to about 70% copper, from about 0% to about 18% cobalt, from about 3% to about 20% nickel, and from about 1% to about 3% gold, with the remainder essentially all manganese, but not less than about 20% manganese.

2. A brazing alloy of relatively high tensile shear strength at elevated temperatures, said alloy consisting of about 52.5% copper, about 9.00% nickel, about 35.5% manganese, and about 3% gold.

* * * * *